United States Patent
Shedletsky, III

(10) Patent No.: US 9,358,451 B2
(45) Date of Patent: Jun. 7, 2016

(54) PERSONALIZED SERVER-BASED SYSTEM FOR BUILDING VIRTUAL ENVIRONMENTS

(75) Inventor: John James Shedletsky, III, Belmont, CA (US)

(73) Assignee: Roblox Corporation, San Mateo, CA (US)

(*) Notice: Subject to any disclaimer, the term of this patent is extended or adjusted under 35 U.S.C. 154(b) by 166 days.

(21) Appl. No.: 13/412,921

(22) Filed: Mar. 6, 2012

(65) Prior Publication Data

US 2013/0239017 A1   Sep. 12, 2013

(51) Int. Cl.
*A63F 13/48* (2014.01)
*A63F 13/00* (2014.01)
*G06F 9/455* (2006.01)

(52) U.S. Cl.
CPC ............ *A63F 13/00* (2013.01); *G06F 9/45558* (2013.01); *G06F 2009/45562* (2013.01)

(58) Field of Classification Search
CPC   A63F 2300/69; A63F 2300/205; A63F 13/48
See application file for complete search history.

(56) References Cited

U.S. PATENT DOCUMENTS

| | | | |
|---|---|---|---|
| 8,490,007 B1* | 7/2013 | Hoffman et al. | 715/772 |
| 2007/0129126 A1* | 6/2007 | Van Luchene | 463/1 |
| 2008/0163089 A1* | 7/2008 | Altieri | 715/764 |
| 2008/0303829 A1* | 12/2008 | Fleury et al. | 345/473 |
| 2011/0265019 A1* | 10/2011 | Ecevit et al. | 715/757 |
| 2013/0143669 A1* | 6/2013 | Muller | 463/42 |

* cited by examiner

*Primary Examiner* — Jennifer To
*Assistant Examiner* — Terri Filosi
(74) *Attorney, Agent, or Firm* — Donald R. Boys; Central Coast Patent Agency, Inc.

(57) ABSTRACT

A system for creating and operating virtual environments includes an Internet-connected server, and software executing from the server from a non-transitory physical medium, the software providing a first function for providing computational resources for creating and operating the virtual environments upon consumer request, a second function for providing administrative control over the created virtual environments to individual ones of the creators of those virtual environments, and a third function for providing a secure interface for matching individual visitors to the created virtual worlds and granting access thereto according to the administrative policies of those individual virtual worlds born through operation of the second function.

18 Claims, 6 Drawing Sheets

PERSONALIZED SERVER-BASED SYSTEM FOR BUILDING VIRTUAL ENVIRONMENTS

BACKGROUND OF THE INVENTION

1. Field of the Invention

The present invention is in the field of Internet gaming services and pertains particularly to methods and apparatus for providing personalized build and administrative services for creating and administering two-dimensional and three-dimensional virtual environments.

2. Discussion of the State of the Art

In the field of online gaming services, typically practiced over a network such as the Internet network, virtual world environments are available for interaction by a broad consumer base. These virtual environments are created to attract users to become site members and to become loyal to a particular gaming services provider. Virtual environments include virtual games and virtual worlds with one or more games or objectives.

One problem with managing interaction in a virtual world is many potential clients do not posses the computing power to react efficiently to changes in the environment. Moreover, one user's computational prowess relative to their accessing gaming appliance may be quite different from that of another user. Therefore, the users may not be on equal footing when interacting within a virtual world.

Another issue with provisioning of virtual world components is that the physics properties and user interaction policies are largely equated across the board lending to a highly predictable and often stagnate or non-evolving interaction experience. For example, all players having the same powers and ability to edit certain aspects of the environment. Higher-level interaction tasks are reserved for users that have earned such privileges through hitting interaction goals or targets. These achievements may eventually lead to higher roles such as moderator or administrator. Almost all building and modification tasks are carried out by the system (administration) according to investment-driven expectation. In these systems, the user experience is not really their own. The users have no control over the basic aspects of the world or how to interact within the world.

Therefore, what is clearly needed is a system and methods that solve the above problems through personalizing the experience for each individual associated with a virtual environment.

SUMMARY OF THE INVENTION

The problem stated above is that personalization of virtual environments created by users and access to sufficient computational resources are desirable characteristics of creating and operating a virtual environment, but many of the conventional means for personalizing the virtual world experience, such as by providing a limited set of moderating powers, or a limited set of tools for building the virtual environments, where such tools and powers are virtually equal for all users or tiered according to group status and separation, also create a predictable, non-evolving, virtual world environment. The inventors therefore considered functional components of an online gaming system, looking for elements that exhibit interoperability that could potentially be harnessed to provide personalization capabilities and unfettered access to computational resources for builders and consumers but in a manner that would not create predictability.

Every gaming system is driven by patronage, one by-product of which is an abundance of users who engage in various parts of the gaming process. Most such gaming systems employ gaming servers with client interfaces to aid builders and patrons of games and virtual environments toward a fulfilling online experience, and networked servers executing client software applications are typically a part of such apparatus.

The present inventor realized in an inventive moment that if better access to computational resources and better personalization of the online gaming experience could be provided during online interaction with virtual environments, significantly higher consumer loyalty statistics might result. The inventor therefore constructed a unique system for building and operating virtual environments that allowed for access to hosted computational resources dedicated for building virtual three-dimensional environments and allowed complete personalization and user-based administrative control over such environments. A significant up tick in consumer loyalty results, with no impediment to uniqueness and efficiency of operation created.

Accordingly, in one embodiment of the present invention, a system for creating and operating virtual environments includes an Internet-connected server, and software executing from the server from a non-transitory physical medium, the software providing a first function for providing access to computational resources for creating and operating the virtual environments upon consumer request, a second function for providing administrative control over the created virtual environments to individual ones of the creators of those virtual environments, and a third function for providing a secure interface for matching individual visitors to the created virtual worlds and granting access thereto according to the administrative policies of those individual virtual worlds born through operation of the second function.

In a preferred embodiment, the computational resources are multiple and networked gaming servers hosted by a provider of a service enabled by the system. Also in a preferred embodiment, the virtual environments are three-dimensional worlds executable and operable using one or more than one of the game servers.

In one embodiment, the administrative control includes control over which visitors may access a created virtual environment and to what extent the visitors granted access might modify the virtual environment. In a variation of this embodiment, visitor access to and or modification capability of a created virtual environment are controlled by the visitor's public classification status. In another variation of the embodiment, the visitor's classification is a social network-derived or hosted classification. In another variation of the embodiment, the subject of the visitor's public group association controls visitor access to and or modification capability of a created virtual environment. In a further variation, the visitor's group association subject is a social network-derived or hosted subject.

In one embodiment, a single virtual environment has one or more than one creator. In one embodiment, the secure interface is a Web-based interface accessible to a gaming appliance through the Internet network. In one embodiment, the software further provides a fourth function for geographic three-dimensional representation of multiple virtual worlds with demarcation between adjacent worlds embodied by virtual boundaries that are geographically represented and administratively controlled. In this embodiment, geographic representation of a created virtual environment includes assignment therein of one or more sets of real-life geographic location data. Also in this embodiment, certain physical characteristics associated with the one or more sets of geographic location data are physically simulated in the virtual environment pursuant to the represented geographic location.

In one embodiment, the computational resources include a build-studio toolbar interface containing at least one build process control. In one embodiment, the administrative control includes control over what tags are used to index a created virtual environment in a search engine. In a variation of the embodiment including the fourth function for geographic representation of multiple virtual environments, a creator of a virtual environment determines which other virtual environments are geographically adjoining to the created virtual environment. In another variation to the embodiment above, the physical characteristics include season, time, and fauna state associated with season and time.

In one embodiment where multiple networked servers are employed, the computational resources include the capability of storing the created virtual environments in a non-activated state and the capability of executing created virtual environments upon request by an authorized creator or visitor. In one embodiment where visitor access and modification capability of a virtual network is controlled administratively, access to a created virtual environment includes monitoring at least one social network for potential visitors, and inviting those visitors based on visitor attributes including one or a combination of interests, skills, demographics, friend status, or any specific subset of these. In a preferred aspect, all operation of, including building and editing of created virtual environments occurs on the network.

BRIEF DESCRIPTION OF THE DRAWING FIGURES

DETAILED DESCRIPTION

The inventors provide a unique personal build and publishing service for creating and administering virtual environments on the Internet that allows users to create, own, and administrate virtual environments using cloud-mediated computational resources. The present invention is described in enabling detail using the following examples, which may describe more than one relevant embodiment falling within the scope of the present invention.

Figure 1:
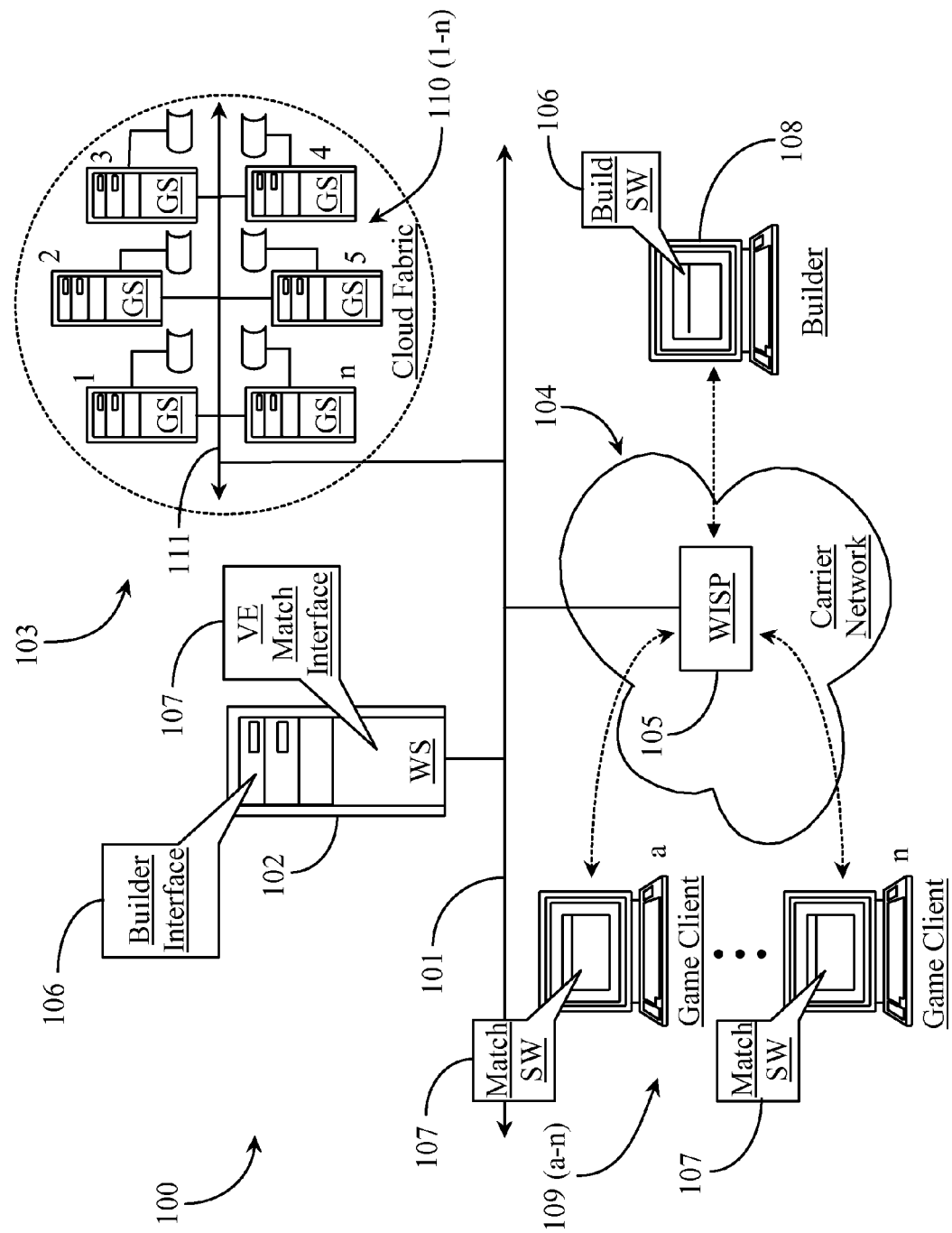
FIG. 1 is an architectural overview of a gaming network practicing personal build services according to an embodiment of the present invention.

FIG. 1 is an architectural overview of a gaming network 100 providing personal build services according to an embodiment of the present invention. Gaming network 100 includes the Internet network depicted herein as Internet network backbone 101 said term being synonymous in this specification with Internet network 101 and Internet 101. Internet network 101 includes all of the lines, equipment, and access points that make up the Internet as a whole, including connected sub-networks. Therefore, there are no geographic limitations to the practice of the present invention. Internet 101 is chosen as a preferred network for accessing personal build services because of its high public access characteristic. However, other network types may be considered for hosting the service such as corporate wide-area-networks (WAN), municipal area networks (MAN), and local area networks (LAN).

Gaming network 100 includes a communications carrier network 104. Carrier network 104, said term being synonymous in this specification with carrier network 104 and carrier 104. Said carrier network 104 may be a third or fourth generation (3G, 4G) digital cellular network, a wireless fidelity network (WiFi), or another digital wireless carrier that has access to Internet 101. In one embodiment, wired networks may also be considered as a carrier network for accessing personal build services offered through Internet network 101. The inventors choose to illustrate a wireless carrier such as carrier 104 in a preferred embodiment because of the wireless connectivity attributes of the majority of gaming computing appliances used to create and promote virtual three-dimensional environments and games.

Internet backbone 101 supports a web server (WS) 102. Web server 102 includes a non-transitory physical medium adapted to contain all of the data and software required to enable function as a web server, serving static and/or dynamically generated web pages to consumers. Web server 102 may be maintained and hosted by a third-party web-hosting service in one embodiment. In another embodiment, web server 102 may be maintained and hosted by the provider company of the service of the present invention. The service of the invention allows persons to access sufficient computational resources and tools required to create, administer, and promote a personal virtual environment using distributed computational resources (cloud mediated computing) hosted by the service provider in this example.

Computational resources are provided to potential builders and clients of personalized virtual worlds through cloud fabric 103. Cloud fabric 103 comprises multiple gaming servers (GS) 110 (1-n) and connected mass repositories depicted as online storage in this example. Gaming servers 110(1-n) include non-transitory physical mediums adapted to contain all of the data and software required to enable function as a gaming server. Additional content servers such as file servers, graphics servers, and data servers may be assumed present and active in this example though not implicitly illustrated herein to conserve drawing space. Gaming servers 110(1-n) are supported in this example by a LAN 111 connected to Internet backbone 101 as a connected sub-network. In this example, gaming servers 110(1-n) provide the required computational resources for building three-dimensional virtual environments, executing those environments, and managing their runtime interactions, and statistics.

Web server 102 includes a client-interfacing website where clients may access online computational resources hosted in cloud fabric 103 for the purposes of building, administrating, editing, and interacting with personally owned virtual environments. The client website includes a link to a builder interface 106. Builder interface 106 includes all of the tools available to clients for creating and instantiating three-dimensional virtual worlds. Builder interface 106 is available to clients that wish to create and administer their own private virtual world. A builder depicted, in this example, as a computing appliance 108, or appliance 108, connected wirelessly to a wireless Internet service provider (WISP) 105 in carrier network 104, accesses the client website hosted in WS 102 to access the builder interface 106.

Builder interface 106 executes from server 102 and provides redirection to computational resources in cloud fabric 103 for the computing resources required to build a virtual environment. Builder interface 106 is demonstrated as executed from server 102 and displaying on client computing appliance 108, which may be a laptop computer in this example. Other gaming appliances might be used in place of appliance 108 including but not limited to a smart phone, an android device, an iPad, a notebook, or any other potential gaming appliance capable of accessing the Internet. Interface 106 may include a builder studio that displays as a tool set or tool bar giving the builder, operating appliance 108, access to all of the available tools. It is noted herein that access to builder interface 106 is maintained only when the client, operating appliance 108, is connected to server 102.

Once the client operating appliance 108 creates a virtual environment, it may be stored in the mass repository of any of game servers 110(1-n) in cloud fabric 103. There, it may be executed pursuant to any need such as visitors accessing the environment, or a builder or administrator editing or modifying the virtual environment. If no users are interacting with the environment it may be shut down and stored for a subsequent execution. In such an embodiment, the virtual environment may evolve while it is in storage through a time-based process that computes rates of growth for fauna such as vegetation including crops climate, and other fauna if such objects are predicted to grow or change over time.

The automated changes can be accomplished during pre-execution of the virtual environment where the evolving components are automatically brought up to date relative to the time period that was present between the last shut down of the virtual world and the next runtime of that virtual world. In an example, suppose a crop of corn existed in shoot stage just before the virtual environment was taken offline. During the next execution, software such as an automatic fauna manager (detailed later in this specification) may determine by the length of time between the last shutdown and the current execution request, if any fauna such as the corn crop should be updated to reflect growth over the time period that the environment was offline. The state of growth of the corn can be updated during a pre-execution step so that when the environment becomes accessible to clients online, the most current state of growth can be seen in the crop. All other evolving fauna types can be updated in the same way. In one embodiment, a virtual environment may be back versioned to a previous time by using snapshot technology so an owner may be able to revert a virtual world state to a previously saved version of the world.

Game clients 109(a-n) are illustrated in this example as connected to server 102 via wireless carrier network 104 and WISP 105. Game clients 109(a-n) represent individuals that are associated in some capacity to one or more created virtual worlds. In addition to providing the tools and computational resources required to build three-dimensional virtual environments, the service of the invention also provides full control of created environments to owners who may set administrative policy regarding who will be allowed to interact with the created environment and who might have the capability of modifying, editing, and interacting with virtual environment characters and terrain.

Administrative rules can be granular to the point of specifying various levels of interaction and modification or editing capabilities for certain individuals who might be recruited or otherwise desire to interact with the virtual environment. In one embodiment, such individuals may be recruited from friends in social networks or in other collaborative or group associated online venues. Builder interface 106 has administrative tools for setting such policies including and in addition to general rules for interaction within the virtual environment.

Web server 102 includes a virtual environment (VE) matching interface 107 for clients attempting to visit and potentially interact within a virtual world. Clients operating laptops 109(a) to 109(n) are connected to server 102 through carrier network 104 and WISP 105 and are running match SW 107 executed from server 102. The execution of SW 107 may be automatic whenever a client attempts to enter a virtual world through the Website hosted by the service provider. Match interface 107 provides redirection of clients to virtual environments that they may find interesting and to those that they are already authorized to interact with as some capacity. Matching interface 107 may identify clients during login and may also validate capabilities of those clients to interact with specific virtual worlds. The active state of a created virtual world depends on use in this example. However, that condition should not be viewed as a limitation in practicing the invention.

In one embodiment, all virtual environments created by clients may remain online regardless of usage. However, in one embodiment, such environments may also be taken offline to save computational resources if there are no users interacting with the environment for a preset period of time. These environments may be shut down and saved to disc within cloud fabric 103. In this embodiment, they may be executed to run as needed as was described further above. In one embodiment, an owner may designate who may interact with a created virtual environment and to what levels of interaction are permissible. Such designations may vary from owner to owner and may contain tiers relative to client qualifications, attributes, or other criteria. Match SW 107 may be able to discern these qualifications or attributes and may validate certain clients and empower them with the designated capabilities upon entry to a created virtual environment.

Another administrative capability that may be available through builder interface 106 is an ability to metatag created virtual environments to render them searchable using a search engine interface. In one embodiment, the search engine is available to potential clients visiting the website of the service provider and using the matching interface to find one or more virtual environments in the system by entering certain search terms or keywords. Before entering a created virtual environment, a client may be informed ahead of time about the level of interaction capability afforded to them for the target environment. In another aspect, specific criteria relative to qualifications or certain attributes may be presented to that client in order to enable that client to increase his or her granted level of interaction capability specific to the target virtual world. For example, a builder may designate that all of my Facebook™ friends may enjoy full interaction capabilities while casual visitors to the virtual environment have more limited interaction capabilities. An owner may grant specific levels of capabilities to potential clients where titles are associated with these levels. More about the potential hierarchy of users granted access to a created virtual environment will be described later in this specification.

In one embodiment, a builder who creates a virtual environment using the service of the present invention may publish entry to the environment on a social interaction page such as Facebook™. In this respect, the entry vehicle may be an interactive advertisement that can be automatically posted to the walls of Facebook friends and family by software of builder interface 106. Once published, potential clients who interact with the promotional advertisement may be connected to server 102 and matching interface 107 for redirection to the advertised environment. More than one virtual environment may be included in a single posting. Invites may be included in the promotional effort, including specification of granted interaction capabilities if the client were to accept an invitation from the creator of the environment, or an invitation that is automated such as a system invitation or an invitation from another client who has accessed the virtual environment and may be an administrator or a recruiter that may raise the levels of their own capabilities by bringing in new users.

Figure 2:
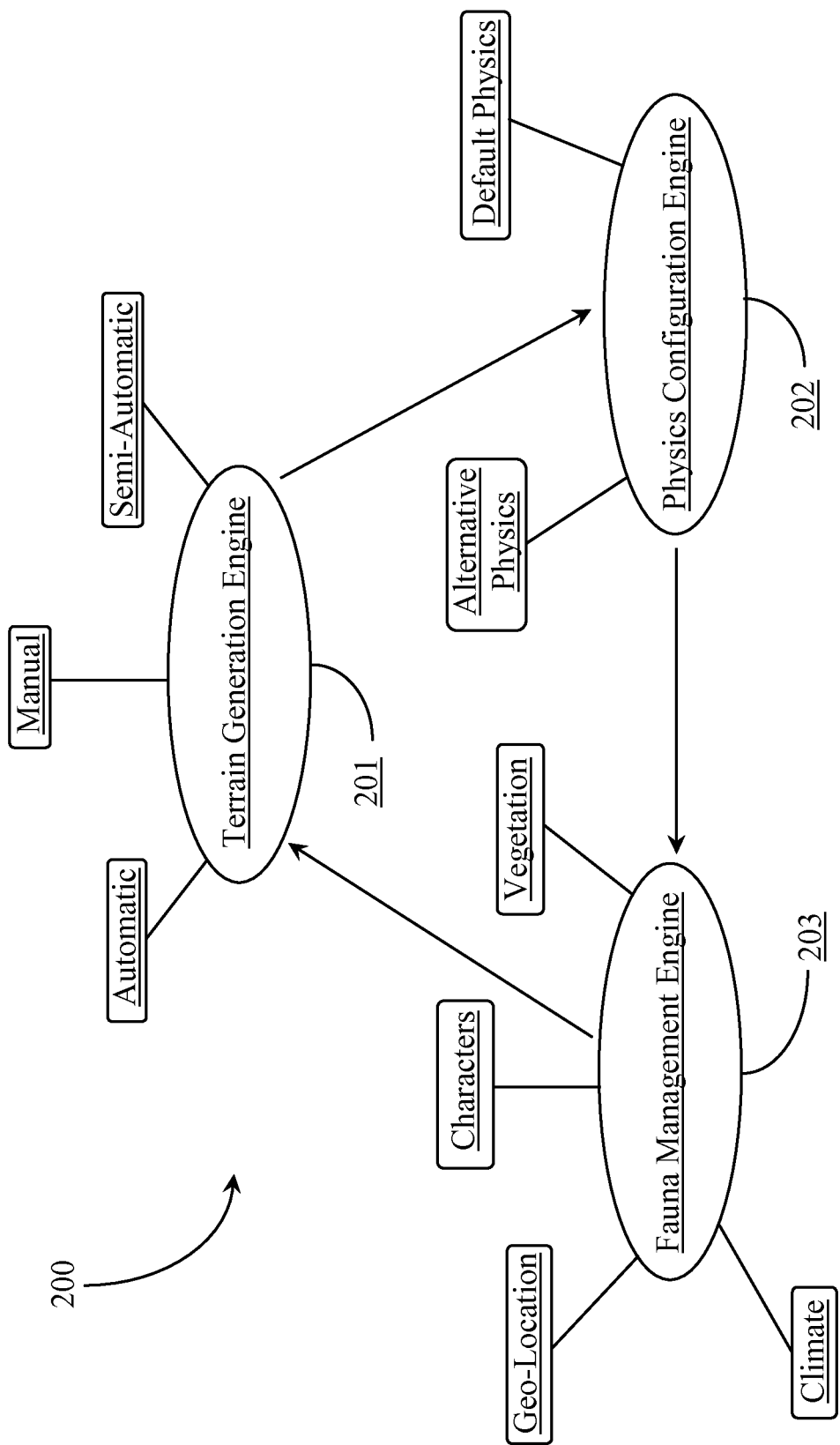
FIG. 2 is a block diagram depicting basic computational resources for building a virtual environment according to the embodiment of FIG. 1.

FIG. 2 is a block diagram 200 depicting basic computational resources for building a virtual environment according to the embodiment of FIG. 1. Diagram 200 depicts, in abstract representation, three basic software engines that may be included in builder interface 106 of FIG. 1. A terrain generation engine 201 is provided to generate terrain in a virtual environment. Terrain generation engine 201 is known to the inventor and may enhance the terrain building process by providing geometrically nested algorithms that enable more terrain building blocks to be added to terrain using fewer computational resources than other systems known to the inventor. The terrain-generation engine enables much larger virtual environments to be created more efficiently.

Terrain generation engine 201 includes a mode of automatic (terrain is built automatically at touch of a button). In auto mode, a user may describe a desired terrain and, perhaps set some geologic preferences and size parameters before selecting a button adapted to initiate automated generation of the desired terrain. In one embodiment, terrain generation engine 201 includes a semi-automatic mode (user selects block and sweeps a geographic area to initiate auto terrain generation for that specified area). In semi-auto mode, the user may set and reset parameters for generating terrain in graph-specific portions of the virtual space to create terrain that includes diverse features such as a desert followed by a mountain range.

In one embodiment terrain generation engine 201 also includes a manual mode (user selects and places terrain blocks manually into the terrain space). A user will typically begin the process of creating a personalized virtual environment with the terrain generation engine. It represents just one of the tools that may be available through the builder interface. It is noted that the computation required to generate terrain in this example, is hosted in cloud fabric analogous to cloud fabric 103 of FIG. 1. A user invoking the terrain generation engine may receive one or more interactive displays that enable the user to set parameters such as adjusting for more flat or more hilly terrain and for frequency of features seen in the terrain such as mountains or trees, etc.

A physics simulation engine or the equivalent simulates all of the physical properties of a created virtual world. All of the computation required in real time to physically simulate the physical properties of a created and operating virtual environment is cloud mediated. Multiple virtual environments may be running in the cloud fabric simultaneously. Clients who build, edit, and interact within these virtual worlds do not have to worry about the technical complexities of hosting a multi-user, three-dimensional, virtual environment.

Once a physical terrain has been generated, a creator may have an option of ordering special physical properties that are particular to objects and/or fauna populating the virtual embodiment. In this example, a physics configuration engine 202 is provided for the creator to configure one or more physical properties relative to the created environment. Physical configuration engine 202 has a default physics configuration option and an alternative physics configuration option. The default option provides default physics settings for a portion of or for the entire environment including physics properties for characters, fauna, atmosphere, terrain blocks, etc. The alternative physics option provides one or more alternative physics settings to the default settings. To give an example, a default physics setting holds that objects fall toward the ground or terrain due to gravity. The alternative may hold that there is no gravity and objects float around when dislodged. There are countless alternative properties that can be observed such as rivers running backwards instead of downstream, rain emanating from the ground and falling up into the sky, and so on. In one aspect, a creator may order special physics treatment for specified areas of a created virtual environment that may be defined by boundaries.

A fauna management engine 203 is provided in this example. Fauna management engine 203 is an optional component engine that is adapted to populate a virtual environment with fauna and denizens or creatures based on climate, temperature, terrain, physics settings, and/or geo-properties established for the virtual terrain. Inputting the climate information into the fauna engine may cause the engine to pre-select certain creatures, vegetation, and the like for populating the virtual environment. In one embodiment, the fauna engine pre-selects good matches for the terrain and climate, but allows the creator to have a look at what fauna might be introduced into the virtual environment. In this case the creator may have the authority to select or reject from the returned list for inclusion. In another embodiment, a creator may skip automatic fauna generation and may manually browse available fauna and select which fauna to populate the environment.

In one embodiment fauna management engine 203 works in the background in virtual environments that are offline and saved to disc. In this embodiment, climate, and fauna growth or evolution may continue according to the length of time the environment is offline so that when it is executed again the vegetation growth states, animal or creature evolution, growth, and climate conditions can be updated as if the environment were never shut down. Special time-based rules may dictate the rates of growth, evolution, and seasonal changes that may be part of the physics of the environment. In one embodiment, climate including seasons, accompanying weather and temperature changes may be established automatically by tying the virtual environment to a real life geo-location on earth. For example, tying a virtual environment to the regional location of Florida may result in establishment of the typical seasons, fauna establishment and growth, and associated weather of Florida.

Figure 3:
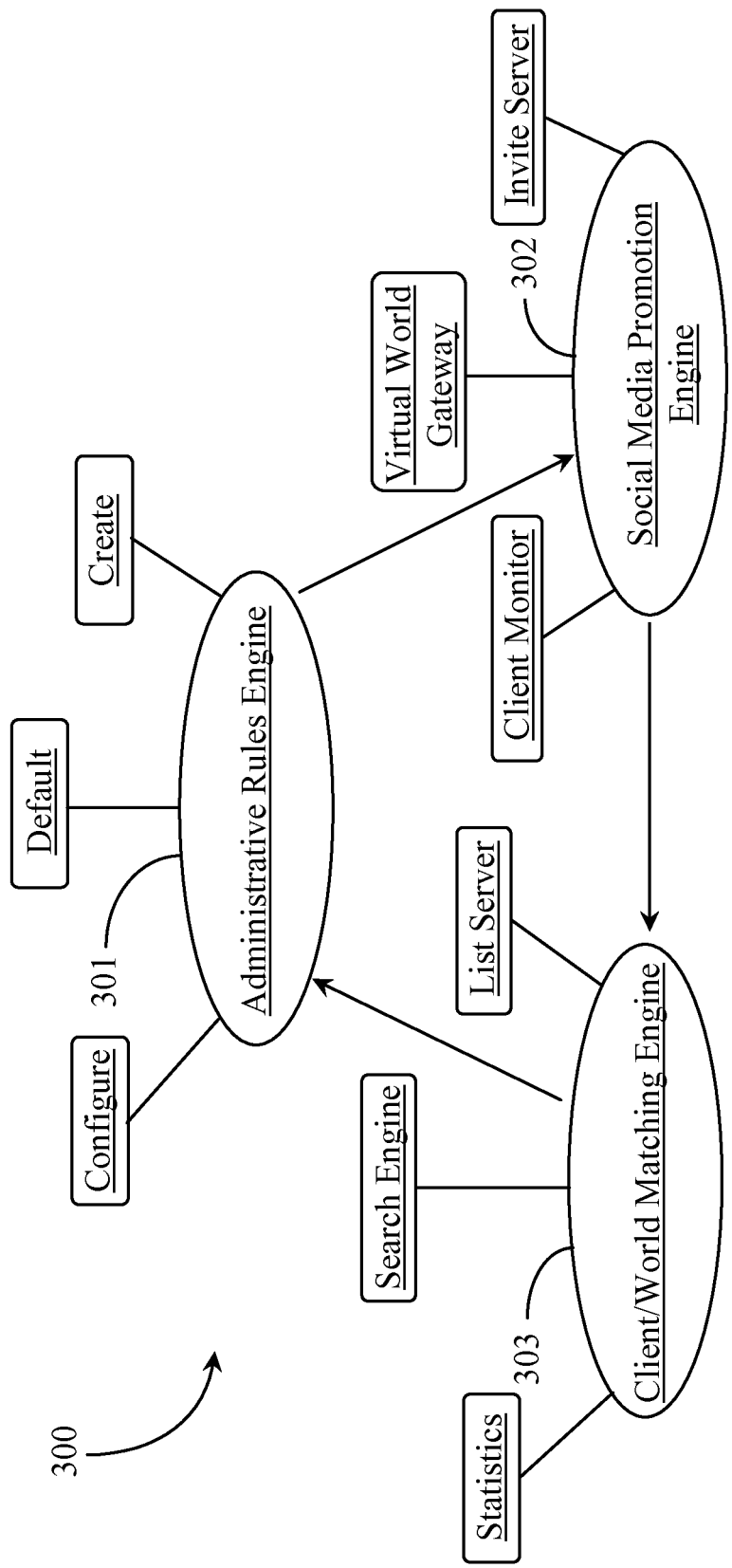
FIG. 3 is a block diagram depicting basic computational resources for setting policy, promoting a created virtual environment, and matching clients to the created virtual environment.

FIG. 3 is a block diagram 300 depicting basic computational resources for setting policy, promoting a created virtual environment, and matching clients to the created virtual environment. Diagram 300 includes an administrative rules engine 301. Rules engine 301 allows creators to set administrative policies that regulate who may visit, interact with, administer, or modify and edit a virtual environment owned by the creator. Rules engine 301 may include default settings established by the system that include titles of individuals that may be granted certain levels of interaction. These titles may include, for example, administrator, member, visitor, and spectator. These titles and associated authentication levels may be applied to persons known to the creator/owner, and/or persons not known to the owner whom are applying or registering for certain levels of capability relative to the virtual environment.

Rules engine 301 may include an option for configuring existing default rules that have one or more option for selection and implementation. Rules engine 301 may also include an option for creating new rules that are not preexisting in the system for virtual environments. Such rules may need approval before implementation. Typically levels of interaction may, by default include no interaction (spectator), limited interaction (visitor), full interaction with no editing capability (member), and full interaction with limited editing and moderating capability (administrator). Rules governing access and interaction with a created virtual world may be associated with and saved with the virtual environment and come into play when the environment is online.

The gaming server running the environment enforces the rules systematically for each environment. For example, if a person not known to the owner attempts to visit the world, a system message may inform the user that he or she is a spectator. Further messaging may inform the user of requirements for elevating his or her capabilities relative to the environment. For example, you may become a member of this environment if you friend me on Facebook™.

In one embodiment of the invention, a social media promotion engine 302 is provided to allow creators of virtual environments to publish their environments to a social media site and to recruit visitors to the virtual environment. Social media promotion engine 302 may include a display that allows the owner to configure a virtual world gateway or portal that can be distributed through email or that may be posted to any social media site the owner is a member of. For example, a rule might be in effect that all of my Facebook friends are automatically members of my virtual environment. Invitations may be automatically created for each Facebook friend, the invites including a virtual world gateway for those who accept the invitation to enter the virtual environment without being required to login at the website. Such invitations may be generated and delivered using an invite server. The system may be enhanced to import contacts such as importing all of the owner's Facebook friends and then auto posting the invitation through the social media site messing system or posting system.

In one embodiment, an owner of a virtual environment may configure a client-monitoring module for posting to any social media site the owner is a member of Such a monitor may monitor for new friends and automatically invite those friends when they are confirmed. In one embodiment, an owner creates a virtual environment that is open to individuals having some common attribute or set of common attributes, political beliefs, ideological beliefs, professional association, hobby interest, or other commonalities that they may share. Some of these attributes may be attributes that are evident in a user profile on a social media site, for example. A monitor in this case may be posted on a creator's wall and may be executed to search for users or user groups that might fit the owner's criteria of desired members or visitors to the created virtual environment. Such user found in the search may then be invited to visit the virtual environments through the distributed gateway or by prompting them to visit the universal resource locator (URL) of the environment.

In one embodiment, a client/world matching engine is provided to match potential clients to created virtual worlds. Matching engine 303 may include a search engine interface that allows potential clients to browse virtual environments or search for virtual environments by key word search terms or phrases. Matching engine 303 may be executed from the service provider website. In this case, any potential visitor may invoke the search engine to search for virtual environments hosted in the cloud that may be of interest to them based on survey, profile information, or form-based information input as part of the search function. A creator of a virtual environment may tag the environment with one or more keywords that describe the environment. Matching engine 303 may include a list server for accessing white and/or black lists from any of the virtual environments. Such lists may be originally created by owners or administrators of a virtual environment and may be used in enforcement of access to a virtual environment.

Matching engine 303 may keep statistics about the search process including how many hits an environment has received through the search engine and how many of those users were granted access to the environment. Other statistics may be available from the "cloud" for owners and/or administrators such as the number of users currently patronizing the environment at any given time, or gaming statistics relative to interaction objectives that might exist in the virtual environment. An example of this might be how many users have reached a top level in a multi-level environment. It is noted herein that a virtual environment may host one or more games, may have one or more levels of interaction, and so on. In one example, a virtual environment may be subject to war games, or to being conquered by another user. In one embodiment, a virtual environment may include hunting or fighting in order to proceed to a "next" level in the environment. Users may be killed forcing them to lower levels or out of the environment altogether. Generally speaking, statistics made available to a owner of a virtual environment may include but are not limited to the number of in-game economic transactions to take place per time period; Search terms and keywords used to locate the environment in a catalog; Influx of users into an environment verses outflow of users to other specific environments; Time spent in-game by users; and Game-specific stats such as number of monsters killed or quests or missions completed or failed.

Statistics related to all of these interactive activities might be made available to creators or, in some cases, administrators so that intelligent editing of the environment may be undertaken. Statistics related to economics such as buying and selling properties, goods, crops, services, vehicles, war machines, and so on may be made available to the owner of the virtual environment. In some embodiment, there may be statistics relative to buildup or recruitment of virtual armies, navies, or other exotic forces that might be used to invade an adjacent virtual world or that might be used to virtually conquer a portion of or all of a virtual environment. A builder may create unique objects that may be for sale through the virtual environment to be used by other users in other virtual environments. Statistics may be made available to the owner or creator that quantifies how much currency was earned through sales, etc. In one embodiment, builders may create new tools, widgets, or other virtual components that may operate as plug in components that might be considered buyware, freeware, or shareware. In this respect, other users may have access to such created tools by visiting a store of such tools or applications operating through or linked to the website.

Figure 4:
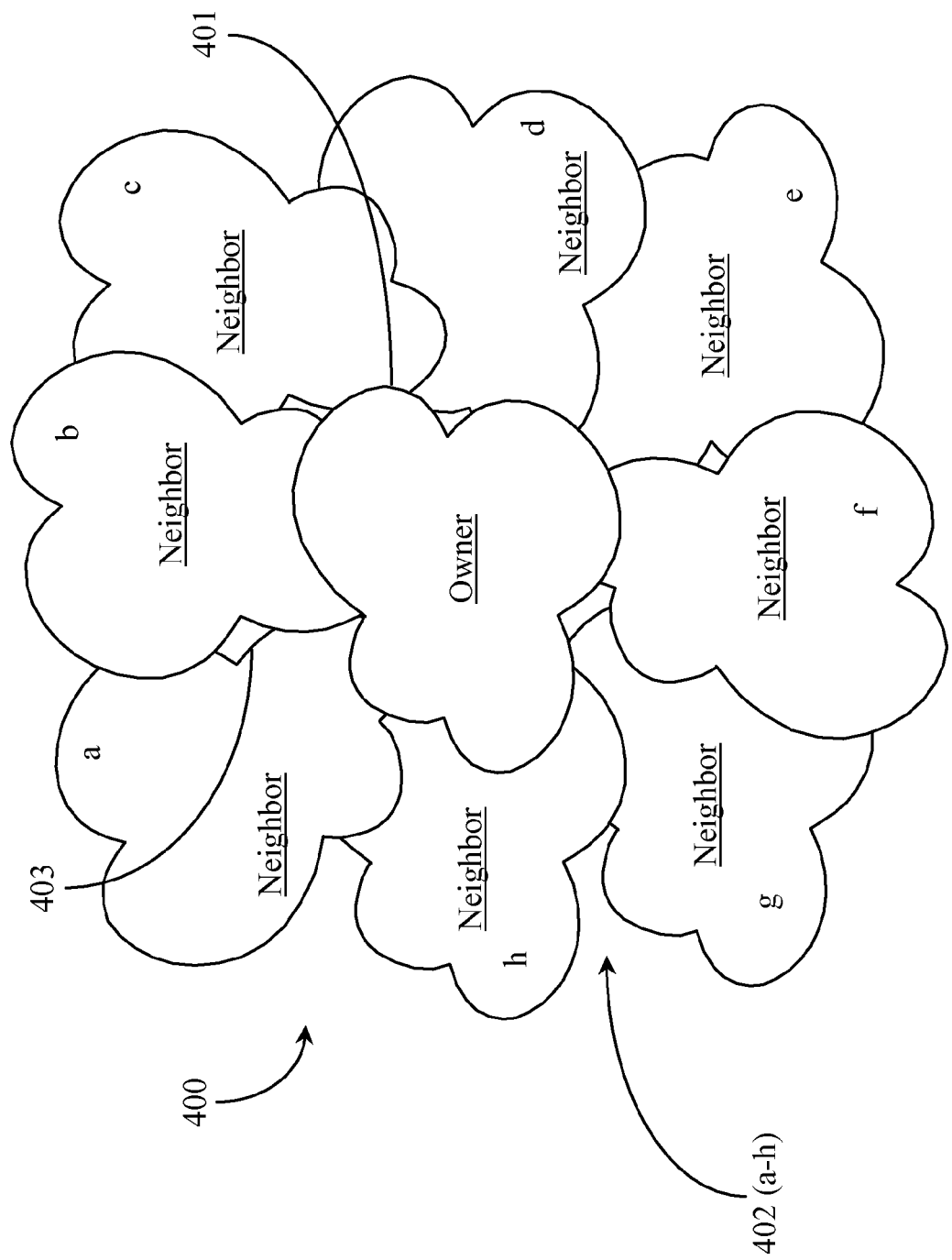
FIG. 4 is a block diagram depicting multiple created virtual environments that have adjacent boundaries according to an embodiment of the present invention.

FIG. 4 is a block diagram 400 depicting multiple created virtual environments that have adjacent boundaries according to an embodiment of the present invention. In one embodiment of the present invention, virtual environments created by owners and other users can be "stitched" together virtually by the system according to desire of the owner. Diagram 400 illustrates multiple virtual environments 402 (*a-h*) that are individually created and virtually associated adjacently according to the preference of the owner of a center environment 401, said center environment 401 synonymous in this specification with environment 401 and virtual environment 401.

In this example, the owner of virtual environment 401 specifies which other virtual environments created by other owners may exist adjacent to environment 401. Virtual environment 401 has eight neighboring environments in this embodiment, but may have fewer or more adjacent environments without departing from the spirit and scope of the present invention. The owner of environment 401 may select virtual environments 402 (*a-h*) by any criteria such as by knowing the other owners and being members of their environments. In one embodiment, selection criteria may relate to the type of or terrain of the environment or by the environments that are tied into real life geo-coordinates on earth and would (in real life) lie adjacent to the subject environment from the perspective of that owner.

Clients that originally visit environment 401 may navigate to a neighbor environment according to provisions set by the owner. For example, one may leave environment 401 by foot and step into neighbor environment 402(*a*). Depending on elevation and nature of the boundaries other means of transportation may be required such as by ship, rocket, car, plane, or helicopter. In one embodiment, each owner of each virtual environment may dictate which neighbors may lie adjacent to his or her environment. The owner may also dictate how each adjacent world may be accessed from his or her world. A visitor traversing from one world to an adjacent world may be required to observe the rules of the adjacent environment. For example, an adjacent environment may have a very different set of neighbors. For two virtual environments to border one another, there should be some agreement between the owners thus setting policies for traversing the boundaries of the environments and for other purposes.

In one embodiment, the owner declares who his neighbors are, but the neighbors also declare who their neighbors are as described above. In this case a user initially logging in into one environment may cross into another neighboring environment owned by another user. However, if the original owner's environment is not recognized as a neighbor by that user, the way back to the original embodiment may not exist. A universal mapping of multiple virtual environments (all those connected) may be created and provided to travelers in two-dimensional or three-dimensional format for use in navigating to multiple environments within the universe. This may comprise the "multiverse" containing all of the universes comprising the virtual environments that are "open" for visitors. These environments may have several boundaries with other environments in the universe, though specific routes taken across boundaries may be one-way if the adjoining environment does not recognize the environment the visitor appeared from as a neighbor. The entrance of the visitor may be an unpredictable event from the perspective of the entered environment.

Multiverses may exist by stitching owner-declared universes together. For example a universe may be one that is created by one original owner of a virtual environment and a declaration of a number of other environments that the owner wants adjoining his environment thereby constituting a universe of multiple environments (as the owner sees it). A neighbor adjacent to that owner (from the owner's perspective) may have his or her own universe (as that owner sees it). In one case, the original environment in the first universe might also be represented in a different location in the second universe or might not be represented at all. However, redundancy (two or more representations of a single environment in a universe) may have no effect on travel other than requiring new routes to get back to the first environment visited. In one variation to this embodiment, a virtual environment may be an isolated world or island that has no neighbors. Travel to and from these isolated environments may be simulated via rocket ship, sailing ship, portal, wormhole, or other mechanisms.

Referring now back to FIG. 4, environment 401 has eight neighboring environments 402(*a-h*). A portion of each neighbor boundary touches the owner boundary. These could be negotiated boundaries between the owner and each neighbor where the neighbors may be Facebook™ friends of the owner, for example. Also, in this example, each neighbor 402(*a-h*) shares a boundary with an adjacent neighbor on either side. These may be collateral boundaries initially, but the neighbors may see them and negotiate them after they materialize or may change them or even eliminate them. Another collateral feature from producing a universe of neighbors are tracts 403 of no-mans land between boundaries of adjacent environments. This feature may be present or it may be mitigated so all boundaries are resolved or "stitched".

Figure 5:
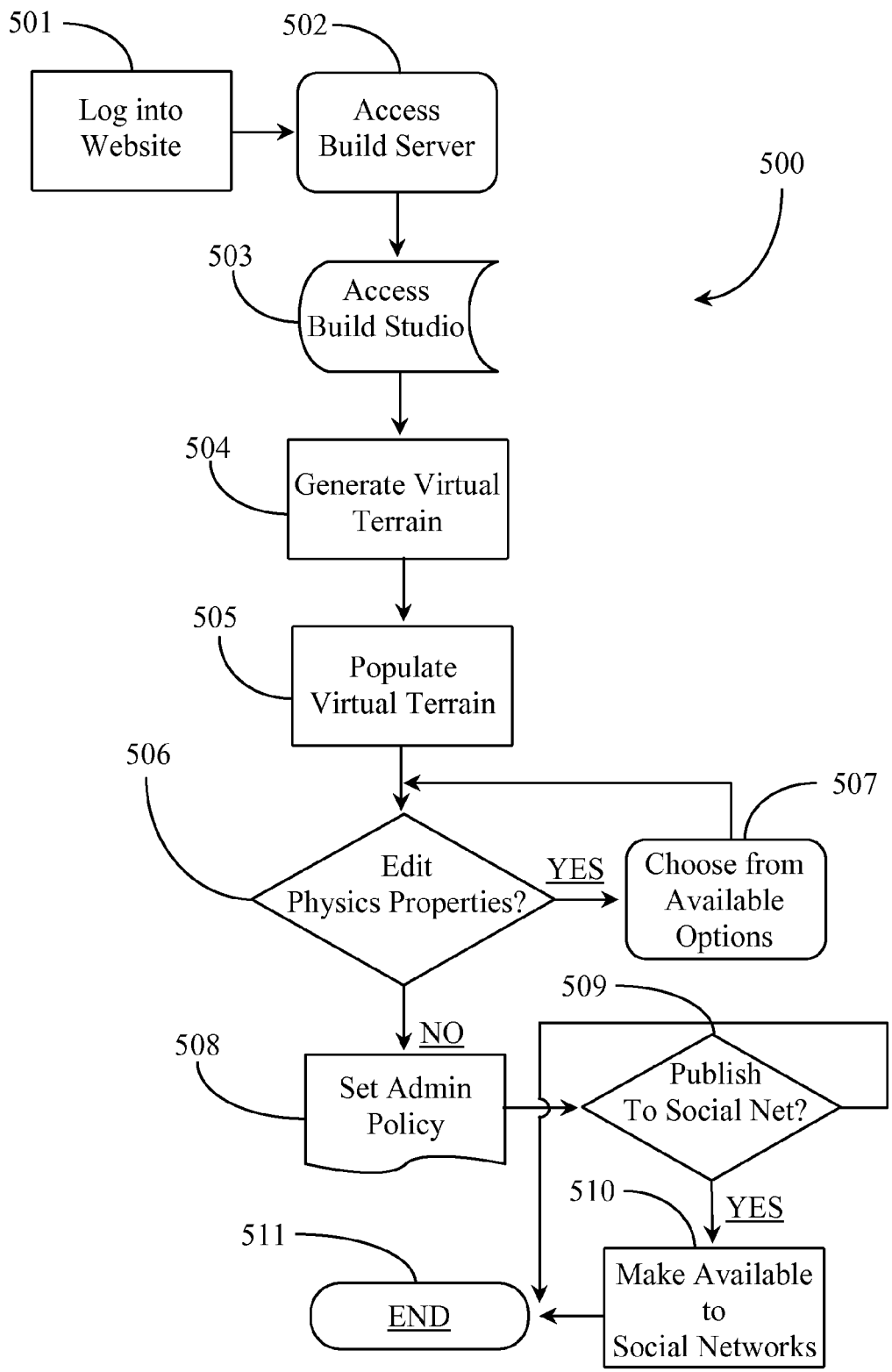
FIG. 5 is a process flow chart depicting steps for creating and publishing a virtual environment.

FIG. 5 is a process flow chart 500 depicting steps for creating and publishing a virtual environment. At step 501 a user logs into a website analogous to one hosting the builder interface 106 and the client-matching interface 107 of FIG. 1. The website may be hosted by a gaming company that also provides the personalized builder service. At step 502, the client is redirected to access the build sever in the cloud that supports the builder process. At step 503, the client accesses a build studio, which is a SW tool kit enabling the client to begin building a virtual environment.

At step 504, the client may generate virtual terrain using a terrain builder from the build studio of step 503. The terrain blocks may be stored in a voxel engine and may be automatically deployed to generate and smooth the terrain. The terrain may include one or a combination of desert, hills, forested lands, mountains, swampy terrain, canyon lands, caves, ravines, and so on. At step 505, the client populates the terrain with the desired fauna and other denizens such as may be available through the catalog. In one embodiment, population in the virtual terrain is automatic when the client invokes a "fauna manager". The fauna manager may populate the terrain based on minimal or more detailed input. If the terrain is tied to a real-life geo-location, the fauna manager may automatically populate the terrain based in part on the terrain type, and the climate and temperature of that terrain. In another case, the client may use a semi-automatic or manual process of populating the terrain. In a semi-automatic process the client may initiate a search for certain fauna types and may approve certain results of the search for population into the virtual environment.

At step 506, the client may desire to edit the physical properties of the environment under creation. Physical properties relate to the way the physics simulation engine will treat the environment. For example, one could eliminate or reverse the law of gravity in a virtual environment. If the client chooses not to edit physical properties at step 506, then the process may move directly to step 508. If the client decides to edit physical properties at step 506, then at step 507 the client may choose from available options. These options may be somewhat static and limited, for example water flows upstream as opposed to downstream, plants grow sideways instead of upwards, etc. The client may select from one or the other. Other options may be available to the client and in some embodiments; the client may be authorized to create a new physical property.

Once editing is finished at step 507, the process resolves back to the decision process until no more edits are desired. The process moves to step 508 where administrative policy may be set. At step 508, the client is, in this example, allowed to set administrative policy relative to who may visit the created environment and at what capacity or level of interaction those visitors may posses. The attributes for visitation and interaction may be far and wide, however, one application is to project attributes from a social interaction group into the virtual environment patronage. For example, the builder's Facebook™ friends may visit and interact with the environment, but may not change the environment. The top three Facebook™ friends may be granted some administrative authority for changing and modifying some components or features of the created environment. It is noted here and elsewhere in this specification that there might be more than a single owner of a virtual environment. It is also noted that an owner and administrator may be one and the same in some cases.

Once policy is set for a created virtual environment, a client may have the opportunity of publishing access (link) to the environment to one or more social interaction sites to which they may be members. At step 509, if the client decides not to publish the virtual environment to a social interaction site, the process resolves to step 511 and the process ends for that client/owner. If the client decides to publish the virtual environment to a social interaction site, the system makes the virtual environment available on the designated social network(s) at step 510. This may involve a social media promotion engine analogous to engine 302 of FIG. 3. The system may create a graphic link to the URL of the environment, which is a distributed link, and promotion that could be targeted to other users of the site such as Facebook friends, for example. The ad may be distributed in messages on the site or it may be posted to other users' walls. This may occur on more than one site that the owner is a member of.

Friends and family of the client may further recruitment by reposting it to their other friends and families on the same site. Certain profile attributes may be considered in administrative policy settings for a virtual environment. For example, Facebook friends may visit and interact, and make some modifications while interacting with the environment while Facebook family might be enabled to edit and modify certain aspects of the environment or may even co-own or administer the policies of the environment. In one aspect, two owners of separate worlds that are not currently linked as friends may become friends in order to adjoin the environments as part of a universe. There are many possibilities.

Figure 6:
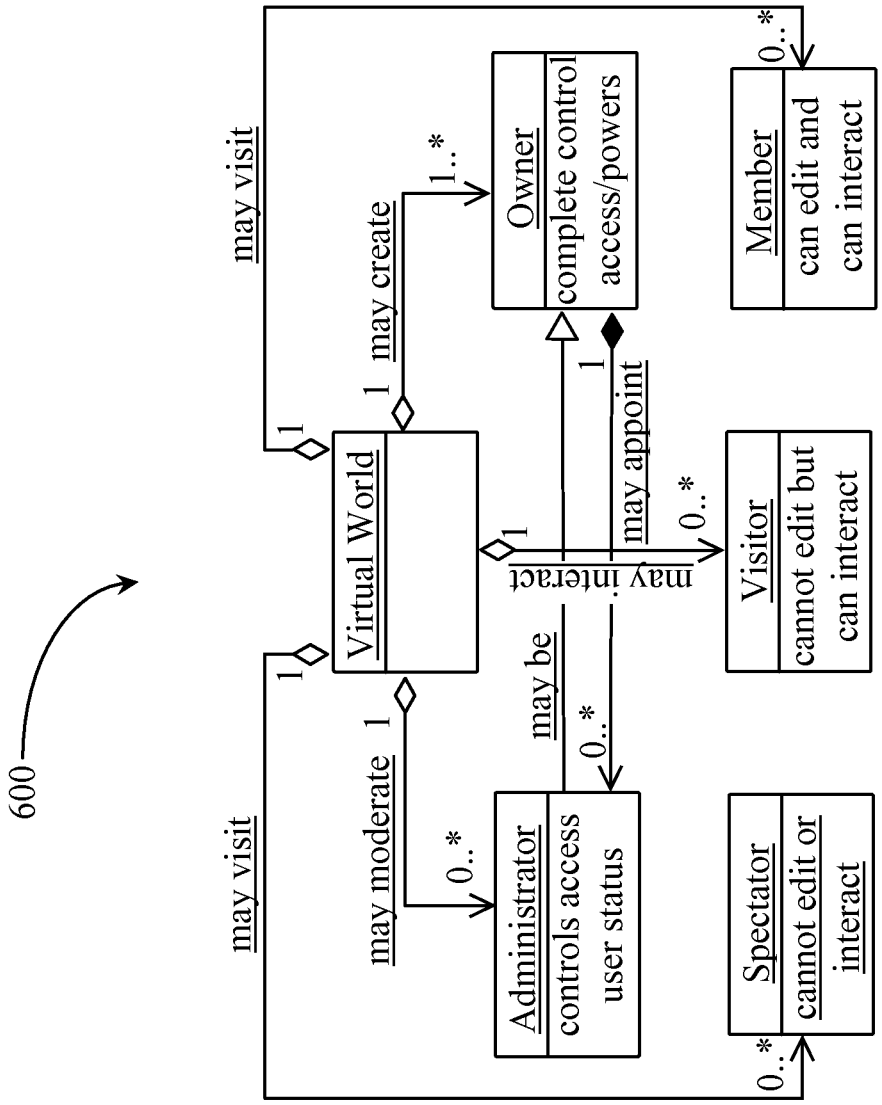
FIG. 6 is a unified modeling language (UML) diagram depicting relationships between a created virtual world and granted or assigned titles to persons associated in varying levels with the created world.

FIG. 6 is a unified modeling language (UML) diagram 600 depicting exemplary relationships between a created virtual world and granted or assigned titles to persons associated in varying levels with the created world. An owner/creator of a virtual environment may set explicit administrative policy that dictates who may visit and interact with a created world and to what levels of interaction are permissible.

At top center of diagram 600 is a created virtual environment also termed world in this example. At bottom left in diagram 600 is a spectator. Zero to many spectators may visit the virtual world. However, in this hierarchy, the spectator cannot edit or interact in the virtual world. At bottom center of diagram 600 is a visitor. Zero to many visitors may interact with the virtual world. A visitor may interact within the world, but may not edit or modify any components within the world. At bottom right in diagram 600 is a member. Zero to many members may visit the virtual world. A member can interact with the virtual world and may edit certain components and features within the virtual world such as building a new house or creating a lake, or planting a crop, etc. The administrator or owner may dictate the extent or level of such interaction.

At middle left of diagram 600 is an administrator. Zero to many administrators may moderate a virtual world. An administrator may control access and user status within the virtual world. Typically 1 or a few administrators may be appointed. An administrator may be an owner. An owner may appoint zero to many administrators. At center right in diagram 600 is an owner. One to many owners may create a virtual world. An owner has complete control over access and powers granted to others that visit the virtual world. An owner may or may not appoint one or more administrators. If the virtual world becomes part of a universe of multiple virtual environments, there may be a higher level of administration, for example, an owner may create multiple virtual worlds and then organizes them into a universe. Therefore, the owner may own the universe and set policy for traversing the universe. There are many possibilities.

It will be apparent to one with skill in the art that the personalized build system for virtual environments of the invention may be provided using some or all of the mentioned features and components without departing from the spirit and scope of the present invention. It will also be apparent to the skilled artisan that the embodiments described above are specific examples of a single broader invention that may have greater scope than any of the singular descriptions taught. There may be many alterations made in the descriptions without departing from the spirit and scope of the present invention.

What is claimed is:

1. A system for creating and operating virtual worlds comprising:
an Internet-connected server; and
software executing on the Internet-connected server from a non-transitory physical medium, the software providing:
access to users to tools enabling the users to create new three-dimensional virtual worlds, including terrain and objects in the new virtual worlds, and to configure physics simulation of objects in the new virtual world;
administrative control over the new virtual worlds to the creators of those virtual worlds including limiting access by players to the new virtual worlds; and
a secure interface for matching players to at least one of the newly-created virtual worlds and granting access according to policies made by the creators of the new virtual worlds;
wherein the matching includes at least considering data in a profile created by the one of the players, the data stored and maintained at a third-party non-gaming social media site remote from the Internet-connected server, and matching an interest derived from the data with at least one new virtual world;
wherein certain physical characteristics associated with the one or more sets of geographic location data are physically simulated in the newly-created virtual world pursuant to the represented geographic location; and
wherein the physical characteristics include season, time, and fauna state associated with season and time.

2. The system of claim 1, wherein the newly-created virtual worlds are managed by multiple and networked gaming servers hosted by a provider of a service enabled by the system.

3. The system of claim 2, wherein the virtual worlds are three-dimensional virtual worlds executable and operable using one or more than one of the gaming servers.

4. The system of claim 2, wherein the tools include a build-studio toolbar interface containing at least one build process control.

5. The system of claim 2, wherein the tools include capability of storing the newly-created virtual worlds in a non-activated state and capability of executing created virtual worlds upon request by an authorized creator or visitor.

6. The system of claim 1, wherein the administrative control includes control over which players may access the new virtual worlds and to what extent the players granted access may modify environments of the virtual worlds.

7. The system of claim 6, wherein player access to, and modification capability of the new virtual worlds is controlled by the data including at least a player's public classification status.

8. The system of claim 7, wherein the data including the player's classification is a social network-derived or hosted classification.

9. The system of claim 6, wherein player access to, and modification capability of, the new virtual worlds is controlled by the data and includes a subject of a player's public group association.

10. The system of claim 9, wherein the player's public group association subject is a social network-derived or hosted subject.

11. The system of claim 6, wherein the non-gaming media site includes at least one social network site subscribed to by the players and administratively controlled access to a newly-created virtual world includes monitoring the at least one social network for the players, and inviting those players based on player attributes listed in the data of the profile including one or a combination of interest, skills, demographics, friend status, or any specific subset of these.

12. The system of claim 1, wherein a single new virtual world has more than one creator.

13. The system of claim 1, wherein the secure interface is a Web-based interface accessible to a gaming application through the Internet network.

14. The system of claim 1, wherein the software further enables geographic three-dimensional representation of a plurality of the virtual worlds with demarcation between adjacent worlds embodied by virtual boundaries that are geographically represented and administratively controlled.

15. The system of claim 14, wherein geographic representation of a created virtual environments world includes assignments of one or more sets of real-life geographic location data.

16. The system of claim 14, wherein a creator of a virtual world determines which other virtual worlds are geographically adjoining to the newly-created virtual world.

17. The system of claim 1, wherein the administrative control includes control over tags used to index a created virtual world in a search engine.

18. The system of claim 1, wherein all operation of, including building and editing of created virtual worlds occurs on the network.

* * * * *